US008056050B2

(12) United States Patent  (10) Patent No.: US 8,056,050 B2
Kuester et al.  (45) Date of Patent: Nov. 8, 2011

(54) METHOD AND SYSTEM FOR GUIDED INCONSISTENCY RESOLUTION IN A MODEL-DRIVEN SOFTWARE ENVIRONMENT

(75) Inventors: Jochen M. Kuester, Zurich (CH); Ksenia Ryndina, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 962 days.

(21) Appl. No.: 12/017,133

(22) Filed: Jan. 21, 2008

(65) Prior Publication Data

US 2009/0187883 A1 Jul. 23, 2009

(51) Int. Cl.
*G06F 9/44* (2006.01)
*G06F 9/45* (2006.01)
*G05B 13/02* (2006.01)
*G06Q 10/00* (2006.01)

(52) U.S. Cl. .............................. 717/105; 700/31; 703/22
(58) Field of Classification Search .................. 717/105; 705/348; 700/31; 703/22
See application file for complete search history.

(56) References Cited

U.S. PATENT DOCUMENTS

| 7,089,529 | B2* | 8/2006 | Sweitzer et al. | 717/104 |
| 7,185,289 | B1* | 2/2007 | Taima | 715/810 |
| 7,958,486 | B2* | 6/2011 | Tsyganskiy et al. | 717/105 |
| 2002/0091990 | A1* | 7/2002 | Little et al. | 717/105 |
| 2003/0105620 | A1* | 6/2003 | Bowen | 703/22 |
| 2005/0080609 | A1* | 4/2005 | Bhaskaran et al. | 703/22 |
| 2006/0136864 | A1* | 6/2006 | Choi et al. | 717/104 |

OTHER PUBLICATIONS

Mens et al., "Detecting and Resolving Model Inconsistencies Using Transformation Dependency Analysis," Springer-Verlag, 2006, 15pg.*
Nuseibeh et al., "Leveraging Inconsistency in Software Development," IEEE, 2000, 6pg.*
Van Der Stratten et al., "Model Refactorings through Rule-Based Inconsistency Resolution," ACM, 2006, 8pg.*
John Grundy et al., Inconsistency Management for Multiple-View Software Development Environments, IEEE Transaction on Software Engineering, 24(11): 1998, 28 pages.

(Continued)

*Primary Examiner* — Li Zhen
*Assistant Examiner* — Ryan Coyer
(74) *Attorney, Agent, or Firm* — Cantor Colburn LLP; Stephen Kaufman (57) ABSTRACT

A method and system for guided resolution of inter-model inconsistencies are provided. A method includes grouping inconsistencies, detected as a result of a model-driven software development process, into model partitions within a list by analyzing relationships between the underlying models and identifying model partitions that are capable of being processed independently from one another during a resolution process. The method also includes assigning priorities to models that contribute to the detected inconsistencies and inconsistency types. The method further includes reordering the list of inconsistencies to minimize the number of context switches during the resolution process and presenting, via a user interface screen, a listing of the inconsistencies and associated resolutions resulting from the reordering to the user at a client system. The user applies a selected resolution for each of the inconsistencies.

6 Claims, 4 Drawing Sheets

OTHER PUBLICATIONS

Alexander Egyed, Fixing Inconsistencies in UML Design Models, Proceedings of the 29th International Conference on Software Engineering (ICSE), May 2007, 10 pages.

Jochen M. Kuster et al., Generation of Business Process Models for Object Life Cycle Compliance, 5th International Conference on Business Process Management (BPM), Brisbane, Sep. 2007, 17 pages.

Jochen M. Kuster et al., Improving Inconsistency Resolution with Side-Effect Evaluation and Costs, ACM/IEEE 10th International Conference on Model Driven Engineering Languages and Systems (MODELS), Nashville, Oct. 2007, 15 pages.

U.A. Nickel et al., The FUJABA Environment, Proceedings of the 22nd International Conference on Software Engineering (ICSE), Limerick, Ireland, 2000, 4 pages.

B. Nuseibeh et al., Making Inconsistency Respectable in Software Development, Journal of Systems and Software, Sep. 2001, 19 pages.

Robert Wagner et al., A Plug-In for Flexible and Incremental Consistency Management, Proceedings of the International Conference on the Unified Modeling Language, San Francisco, 2003, 8 pages.

Alexander Egyed, Instant Consistency Checking for the UML, ICSE 2006, ACM Press, 10 pages.

* cited by examiner

FIG. 1

| No. | Model context | Inconsistency category | Inconsistency type | Model element context |
|---|---|---|---|---|
| 1 | Claim handling, Claim | Conformance | Non-conformant transition | register, Received-Opened |
| 2 | Close account, Account | Conformance | Non-conformant transition | close, Opened-Closed |
| 3 | Claim handling, Payment | Conformance | Non-conformant transition | carry out settlement, Created-Paid in full |
| 4 | Close account, Customer | Conformance | Non-conformant transition | update customer status, Active-Dormant |
| 5 | Claim handling, Claim | Conformance | Non-conformant transition | close claim, Paid-Closed |
| 6 | Claim handling, Payment | Coverage | Non-covered transition | Created-Refused |
| 7 | Manage customer relations, Customer | Coverage | Non-covered transition | Potential-Disqualified |
| 8 | Claim handling, Claim | Coverage | Non-covered initial state | Registered |
| 9 | Launch product campaign, Campaign | Coverage | Non-conformant transition | terminate, Active-Terminated |
| 10 | Claim handling, Payment | Coverage | Non-covered final state | Refused |
| 11 | Manage customer relations, Customer | Conformance | Non-conformant last state | update customer status, Dormant |
| 12 | Claim handling, Payment | Coverage | Non-covered transition | Authorized-Stopped |
| 13 | Claim handling, Claim | Coverage | Non-covered transition | Settled-Closed |
| 14 | Launch product campaign, Campaign | Coverage | Non-conformant last state | terminate, Terminated |
| 15 | Claim handling, Claim | Conformance | Non-conformant transition | evaluate claim, Opened-Rejected |
| 16 | Claim handling, Claim | Conformance | Non-conformant transition | evaluate claim, Quoted-Applied |
| 17 | Develop campaign, Campaign | Conformance | Non-conformant first state | register, Initiated |
| 18 | Claim handling, Payment | Coverage | Non-covered final state | Stopped |
| 19 | Claim handling, Claim | Conformance | Non-conformant transition | evaluate claim, Opened-Granted |

FIG. 2A

| No. | Model context | Inconsistency category | Inconsistency type | Model element context |
|---|---|---|---|---|
| 1 | Claim handling, Claim | Conformance | Non-conformant transition | register, Received-Opened |
| 2 | Claim handling, Payment | Conformance | Non-conformant transition | carry out settlement, Created-Paid in full |
| 3 | Claim handling, Claim | Conformance | Non-conformant transition | close claim, Paid-Closed |
| 4 | Claim handling, Payment | Coverage | Non-covered transition | Created-Refused |
| 5 | Claim handling, Claim | Coverage | Non-covered initial state | Registered |
| 6 | Claim handling, Payment | Coverage | Non-covered final state | Refused |
| 7 | Claim handling, Payment | Coverage | Non-covered transition | Authorized-Stopped |
| 8 | Claim handling, Claim | Coverage | Non-covered transition | Settled-Closed |
| 9 | Claim handling, Claim | Conformance | Non-conformant transition | evaluate claim, Opened-Rejected |
| 10 | Claim handling, Policy | Conformance | Non-conformant transition | evaluate claim, Quoted-Applied |
| 11 | Claim handling, Payment | Coverage | Non-covered final state | Stopped |
| 12 | Claim handling, Claim | Conformance | Non-conformant transition | evaluate claim, Opened-Granted |
| 13 | Close account, Account | Conformance | Non-conformant transition | close, Opened-Closed |
| 14 | Close account, Customer | Conformance | Non-conformant transition | update customer status, Active-Dormant |
| 15 | Manage customer relations, Customer | Coverage | Non-covered transition | Potential-Disqualified |
| 16 | Manage customer relations, Customer | Conformance | Non-conformant last state | update customer status, Dormant |
| 17 | Launch product campaign, Campaign | Coverage | Non-conformant transition | terminate, Active-Terminated |
| 18 | Launch product campaign, Campaign | Coverage | Non-conformant last state | terminate, Terminated |
| 19 | Develop campaign, Campaign | Conformance | Non-conformant first state | register, Initiated |

FIG. 2B

|   | Model context | Model element context | Inconsistency type | Inconsistency category |
|---|---|---|---|---|
| 1 | Claim handling, Claim | register, Received-Opened | Non-conformant transition | Conformance |
| 2 | Claim handling, Payment | carry out settlement, Created-Paid in full | Non-conformant transition | Conformance |
| 3 | Claim handling, Policy | evaluate claim, Quoted-Applied | Non-conformant transition | Conformance |
| 4 | Claim handling, Claim | evaluate claim, Opened-Rejected | Non-conformant transition | Conformance |
| 5 | Claim handling, Claim | evaluate claim, Opened-Granted | Non-conformant transition | Conformance |
| 6 | Claim handling, Claim | close claim, Paid-Closed | Non-conformant transition | Conformance |
| 7 | Claim handling, Payment | Created-Refused | Non-covered transition | Coverage |
| 8 | Claim handling, Payment | Authorized-Stopped | Non-covered transition | Coverage |
| 9 | Claim handling, Payment | Refused | Non-covered final state | Coverage |
| 10 | Claim handling, Payment | Stopped | Non-covered final state | Coverage |
| 11 | Claim handling, Claim | Registered | Non-covered initial state | Coverage |
| 12 | Claim handling, Claim | Settled-Closed | Non-covered transition | Coverage |

METHOD AND SYSTEM FOR GUIDED INCONSISTENCY RESOLUTION IN A MODEL-DRIVEN SOFTWARE ENVIRONMENT

CROSS-REFERENCE TO RELATED APPLICATIONS

This application contains subject matter which is related to the subject matter of the following co-pending application, which is assigned to the same assignee as this application, International Business Machines Corporation of Armonk, N.Y. U.S. patent application No. 12/017,139, entitled "METHOD AND SYSTEM FOR INCONSISTENCY RESOLUTION WITH CYCLE DETECTION IN A MODEL-DRIVEN SOFTWARE ENVIRONMENT," filed on Jan. 21, 2008, the contents of which are incorporated by reference herein in its entirety.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to model-driven software development and, in particular, to a method and apparatus for guided resolution of inter-model inconsistencies, for example between business process models and object life cycles.

2. Description of the Background

During the development of a business process management application, business process models and object life cycles provide two complementary views on the system being developed. Business process models show the system in terms of tasks that have to be performed, as well as control and data flow between these tasks. On the other hand, object life cycles focus on one specific data type and how states of objects of this type change across different business process.

To male the best use of the business process model and object life cycle views in a modeling tool, the user should be able to switch back and forth between them, as well as make changes in either of the views. Making changes to one of the views introduces inconsistencies between the underlying models. As there is often more than one way to propagate a change in one model to the other, the introduced inconsistencies cannot be resolved automatically and appropriate resolutions need to be selected by the user. This situation arises not just for business process models and object life cycles, but whenever different models are created as multiple views on the same system.

Given a collection of business process models and object life cycles, or other models that represent different views on the same system, inconsistencies between them can be detected using state-of-the-art technology. However, the subsequent process of inconsistency resolution gives rise to the following problems: (1) a large number of inconsistencies overwhelming the user; and (2) excessive context switching required during resolution. The first problem makes it difficult for the user to comprehend the overall consistency status of these models and to organize the resolution process. The second problem leads to an increased amount of time required for the resolution process. This is because, for example, context switching in graphical modeling tools requires displaying the relevant model editor and navigating to different parts of models for inconsistency visualization, which tales a noticeable amount of time even using the latest available tools. Furthermore, at each context switch, the user is required to spend time studying the new inconsistency context.

What is needed, therefore, is a way to provide guided resolution for inter-model inconsistencies that minimizes the number of required context switches.

SUMMARY OF THE INVENTION

The shortcomings of the prior art are overcome and additional advantages are provided through the provision of methods for implementing guided resolution for inter-model inconsistencies. A method includes grouping inconsistencies, detected as a result of a model-driven software development process, into model partitions within a list by analyzing relationships between the underlying models (e.g., business process models and object life cycles) and identifying model partitions that are capable of being processed independently from one another during a resolution process. The method also includes assigning priorities to models that contribute to the detected inconsistencies and inconsistency types. The method further includes reordering the list of inconsistencies to minimize the number of context switches during the resolution process and presenting, via a user interface screen, a listing of the inconsistencies and associated resolutions resulting from the reordering to the user at a client system. The user applies a selected resolution for each of the inconsistencies.

Systems corresponding to the above-summarized methods are also described and claimed herein.

Additional features and advantages are realized through the techniques of the present invention. Other embodiments and aspects of the invention are described in detail herein and are considered a party of the claimed invention. For a better understanding of the invention with advantages and features, refer to the description and to the drawings.

TECHNICAL EFFECTS

As a result of the summarized invention, technically we have achieved a solution which provides guided resolution for inter-model inconsistencies. The solution provides for implementing model partitions to identify independent areas of inconsistency resolution in large model sets, which in turn, enable a user to break down the set of detected inconsistencies into more manageable subsets. A multi-level grouping and ordering of the detected inconsistencies is done automatically to produce an inconsistency list for each of the subsets, such that the number of required context switches by the user is minimized. This ordering also takes into account user-assigned priorities of resolving different inconsistencies.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2A is a sample set of inconsistencies detected between a set of business process models and object life cycles as a result of a model-driven software development process;

FIG. 2B is a partitioned inconsistency set, created from the set in FIG. 1, via guided model inconsistency resolution processes in an exemplary embodiment;

DETAILED DESCRIPTION OF THE INVENTION

In accordance with an exemplary embodiment of the invention, methods and systems for providing guided model inconsistency resolution between business process models and object life cycles are provided. The guided model inconsistency resolution processes provide a means for implementing model partitions to identify independent areas of inconsistency resolution in large model sets, which enables a user to break down the set of detected inconsistencies into more manageable subsets. A multi-level grouping and ordering of the detected inconsistencies is done automatically to produce an inconsistency list for each of the subsets, such that the number of required context switches by the user is minimized. This ordering also takes into account user-assigned priorities of resolving different inconsistencies, as will be described further herein.

In one exemplary embodiment, the guided model inconsistency resolution processes provide two consistency notions for business process models and object life cycles: conformance and coverage. Conformance requires a given business process model to induce only those object state changes that are defined in the life cycle of the corresponding object. Coverage requires that objects used in a given process model traverse all the states in their life cycles. Conformance and coverage are precisely defined using consistency conditions that may be checked on a given business process model and a given object life cycle. The business process model is first analyzed to determine state transitions that it can induce on different objects (induced transitions), states in which objects are first encountered during process execution (first states) and states that the objects are in at the end of process execution (last states). These are used to check the consistency conditions, violations of which give rise to inconsistencies of six inconsistency types, each falling either into the conformance or coverage inconsistency categories.

The following definitions for conformance inconsistency categories are provided for ease of description:

Non-conformant transition: a task T in the given business process model induces a transition from state src to state tgt on an object of type o, but this transition is not defined in the object life cycle for o;

Non-conformant first state: a state first is an output state of task T and a first state for objects of type o in the given business process model, but the object life cycle for o does not contain a transition from the initial state to state first;

Non-conformant last state: a state last is an input or an output state of task T and a last state for objects of type o in the given business process model, but the object life cycle for o contains no transition from state last to a final state.

The following definitions for coverage inconsistency categories are provided for ease of description:

Non-covered transition: a transition from state src to state tgt is defined in the object life cycle for o, but it is not induced by any task in the given business process model;

Non-covered initial state: a state init in the object life cycle for o has an incoming transition from the initial state, but init is not a first state of o in the given business process model;

Non-covered final state: a state fin in the object life cycle for o has an outgoing transition to a final state, but fin is not a last state of o in the given business process model.

Each inconsistency has an inconsistency context that comprises models between which the inconsistency occurs (model context) and model elements that contribute to the inconsistency (model element context) and the exemplary embodiment, the model context of any inconsistency falling into the conformance or the coverage category comprises a business process model and an object life cycle. Model element contexts can be derived from the definitions of inconsistency types. For example, the model element context of a non-conformant transition comprises the following elements of a business process model: task T and states src and tgt, while the model element context of a non-covered initial state comprises only the state init in an object life cycle.

For each inconsistency type, one or more resolution types are defined. For example, to resolve a non-conformant transition, input or output states of the context task may be adjusted, the task can be removed from the business process model altogether, or an additional transition may be added to the object life cycle.

When resolving several inconsistencies, the user always has to change from one inconsistency context to another. While such context switching is unavoidable, some context switches can be regarded as more severe than others. If the context of the current inconsistency has some elements in common with the context of the next inconsistency then the context switch can be regarded as less severe than if the two inconsistency contexts have nothing in common.

For purposes of illustration, the guided inconsistency resolution processes will be described with respect to object life cycles for Claim and Payment object types, which includes an extract from a Claim handling business process model. Data flow in the process model may be modeled using disconnected input and output object pins of tasks, implying that tasks read and write objects from intermediate repositories. Object pins of different types may be marked with different colors, and selected input and output object states may be shown in the process model extract. Specification of input and output object states for tasks is the basis for defining consistency between object life cycles and business process models. While the invention is described with respect to business process models, object life cycles and the aforementioned consistency notions for illustrative purposes, it will be understood that the guided inconsistency resolution processes may be applied to other model types and other consistency notions as well.

Figure 1:
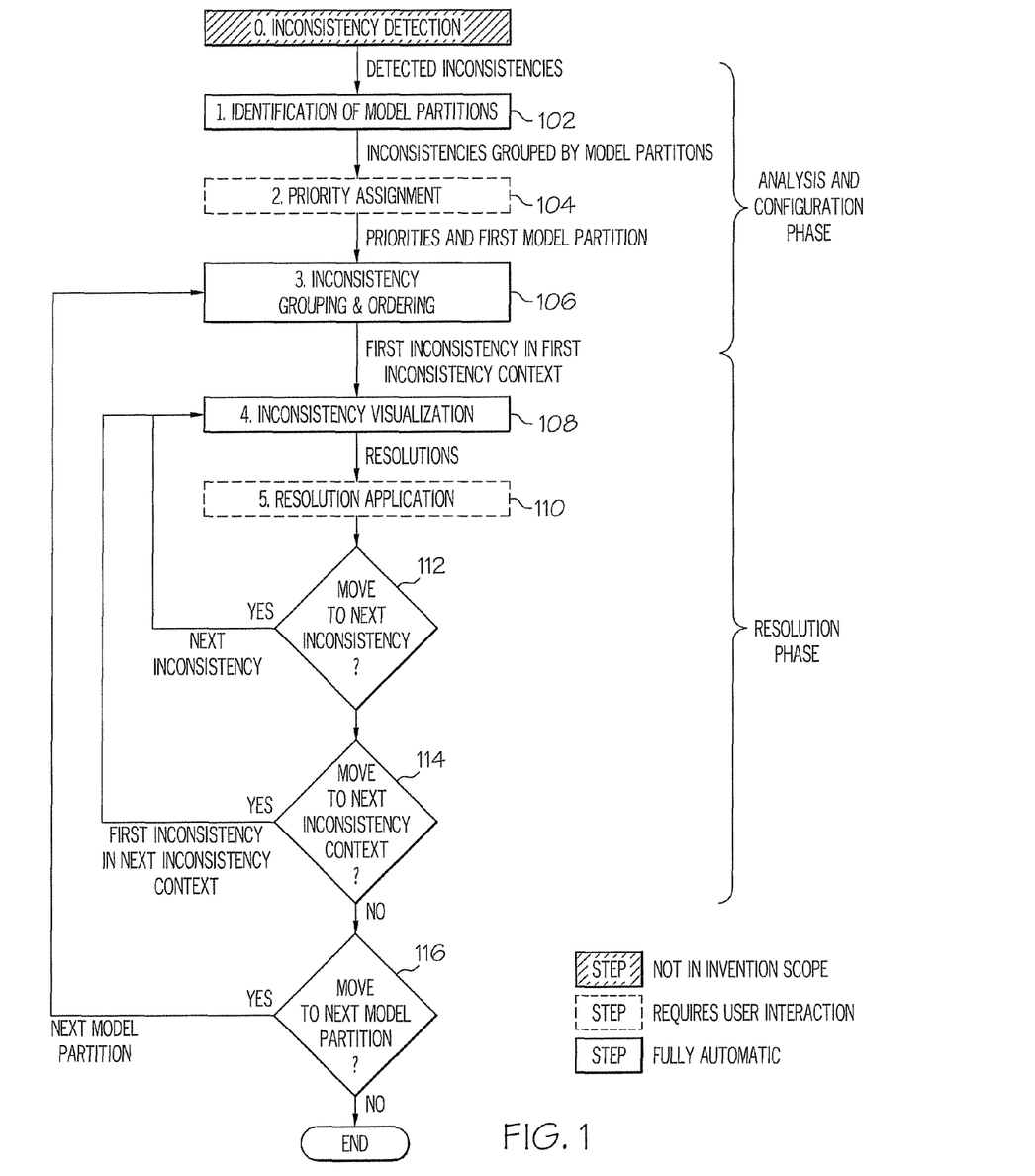
FIG. 1 is a flow diagram illustrating a process for providing guided resolution for inter-model inconsistencies.

Turning now to FIG. 1, a process for implementing the guided model inconsistency resolution processes will now be described. The guided model inconsistency resolution processes comprise a two-phased approach: analysis and configuration; and resolution.

A primary object of the Analysis and configuration phase is to organize a set of detected inconsistencies into more manageable subsets and order them to minimize the number of context switches that the user has to perform during inconsistency resolution. A primary object of the Resolution phase is for the user to process, i.e., resolve or tolerate, all inconsistencies. Inconsistency contexts are visualized one at a time together with all inconsistencies associated with that context. The user applies one of the alternative resolutions for each inconsistency. The guided inconsistency resolution processes described in FIG. 1 assume that a set of inconsistencies have been detected, as shown in FIG. 2A.

At step 102, inconsistencies are first grouped according to interrelated model partitions of the given model set. For the exemplary embodiment, this may be accomplished by analyzing relationships between business process models and object life cycles to identify model partitions that may be processed independently from each other during the resolution process. A model partition may be defined as a maximal connected subgraph of a given undirected graph that has models as nodes and model relationships as edges. Once a partitioning of the models is determined, detected inconsistencies are also partitioned accordingly. A sample partitioned inconsistency set resulting from step 102 is shown in FIG. 2B. These groupings may be color-coded for distinguishing subsets of inconsistencies for each partition.

The user may then provide input into the resolution process by assigning different priorities to models and inconsistency types at step 104. These priorities are taken into account during the multi-level grouping and ordering of inconsistencies in each model partition (step 106). For example, the user may influence the inconsistency resolution process by assigning the following priorities:

Model priority: relative importance of resolving inconsistencies in different models;

Inconsistency type priority: relative importance of resolving different inconsistencies of different types.

These priorities ensure that when there is a choice among several inconsistencies during the resolution process, those with higher priorities will be presented first to the user. For example, inconsistencies 9 and 10 in FIG. 2B are both of the same inconsistency type, have the same business process model (Claim handling) and task (evaluate claim) in their contexts, but have different object life cycles (Claim and Policy, respectively). If Claim is assigned a higher priority than Policy then inconsistency 9 will appear before inconsistency 10 in the ordered list driving the resolution process, and vice versa otherwise.

All priority values may be set to be the same by default and may optionally be changed by the user during the configuration phase. Not to overwhelm the user with too many configuration settings, these may be only displayed on request (i.e., the user has to select an option to assign model priorities first before all the values to be assigned are shown to him).

Model partition priorities may be derived from priorities of models that they contain by calculating the average model priority. Priorities of model partitions determine the order in which these are processed in steps 106 through 110. The user may manually select among model partitions that have the same priority. At the end of this step, the first model partition for inconsistency resolution is identified (e.g., the partition defined by nos. 1-12 in FIG. 2B).

At step 106, the list of inconsistencies for the given model partition is reordered to minimize the number of context switches required from the user and at the same time taking into account user-assigned priorities.

To understand the implementation of the different types of context switches handled by step 106, the following concepts are defined:

Abstract model element context: given an inconsistency i, its abstract model element context, amec(i), is a subset of its model element context that comprises only the main elements used for visualizing inconsistency i.

Abstract model context: The abstract model context of inconsistency i, amec(i), is a subset of its model context that comprises only those models that contain elements of its abstract model element context.

Model element context abstraction is useful for visualizing the location of an inconsistency in a model, for which it may not be feasible or desirable to visualize the entire model element context. For example, abstract model element contexts can be defined as the elements of the model element context that have a graphical representation. We illustrate this by defining abstract model element contexts for inconsistencies between business process models and object life cycles, as follows:

non-conformant transition, non-conformant first state, non-conformant last state: task T;

non-covered transition: transition from src to tgt, non-covered initial state and non-covered final state: states init and fin respectively.

The abstract model context for inconsistencies in the conformance category is always a business process model, while in the coverage category it is an object life cycle. As shown in FIG. 2B, elements of abstract model element contexts and abstract model contexts (nos. 1-12) are marked in bold in the Model element context and Model context columns, respectively.

The following types of context switches that occur during resolution of inconsistencies are defined: model element change and model change. Moving between inconsistencies i1 and i2 requires a model element change if the abstract model element contexts of i1 and i2 do not overlap and it requires a model change if the abstract model contexts of i1 and i2 do not overlap. For example, in FIG. 2B moving from inconsistency 1 to inconsistency 2 requires a model element change, but no model change. On the other hand, no model element change is required when moving from moving from inconsistency 9 to 10.

The guided inconsistency resolution processes not only reduces the number of model element changes and model changes that the user has to perform during resolution, but also avoid taking the user "back and forth" in the same model while going through the list of detected inconsistencies or reduce the number of so-called backward moves.

Assuming that a partial order relation $\preceq_{amec}$ is defined on the set of all abstract model element contexts, a model element change from i1 to i2 is called a backward move in one of the following two cases: if no model change is required from i1 to i2 and amec(i2) $\preceq_{amec}$ amec(i1), or if a model change is required from i1 to i2 and amec(i2) $\preceq_{amec}$ amec(ix), where ix is the last inconsistency processed in amec(i2).

A partial order $\preceq_{amec}$ needs to be defined on abstract element contexts of inconsistencies using some relationships between these elements in their respective model contexts. For example, abstract model element contexts of conformance inconsistencies always comprise tasks in a business process model. Since these are already organized into a directed graph for the same business process model, it is easy to define the partial order $\preceq_{amec}$. Tasks in different business process models simply remain unordered. For coverage inconsistencies, some abstract model element contexts comprise transitions and others comprise states in an object life cycle. In this case, a partial order $\preceq_{amec}$, can be defined by comparing the distances from the initial state to the source states of transitions or to states themselves.

For example, to resolve inconsistencies in the model partition (nos. 1-12) in the order shown in FIG. 2B would require the user to make 8 model changes and 11 model element changes, one of which is a backward move. Table 1 below shows the details of these context switches. The No. column shows at which inconsistency the change would take place, and Target AMC and Target AMEC show to what abstract model and model element contexts the user would change, respectively.

| Model Element Changes | | Model Changes | |
|---|---|---|---|
| No. | Target AMEC | No. | Target AMC |
| 1 | Register | 1 | Claim handling |
| 2 | Carry out settlement | 4 | Payment |
| 3 | Close claim | 5 | Claim |
| 4 | Created-Refused | 6 | Payment |
| 5 | Registered | 8 | Claim |
| 6 | Refused | 9 | Claim handling |
| 7 | Authorized-Stopped | 11 | Payment |
| 8 | Settled-Closed | 12 | Claim handling |
| 9 | Evaluate claim** | | |
| 11 | Stopped | | |
| 12 | Evaluate claim | | |

The model element change to inconsistency 9 is a backward move, since it requires a model change and evaluate claim task $\leq_{amec}$ close claim task that was the last processed abstract model element context for the Claim handling model context.

Model element changes can be reduced by grouping inconsistencies by their abstract model element context, since when all inconsistencies with the same abstract model element context appear together in the list, this context only needs to be visited once. To avoid backward moves, inconsistencies need to additionally be ordered based on the partial order $\leq_{amec}$ defined for their abstract model element contexts. For a more systematic ordering of inconsistencies, a total order based on this partial order can be used. By representing the partial order as a directed graph, a total order can be computed using one of the existing graph traversal strategies, e.g., depth-first traversal or breadth-first traversal.

Figure 3:
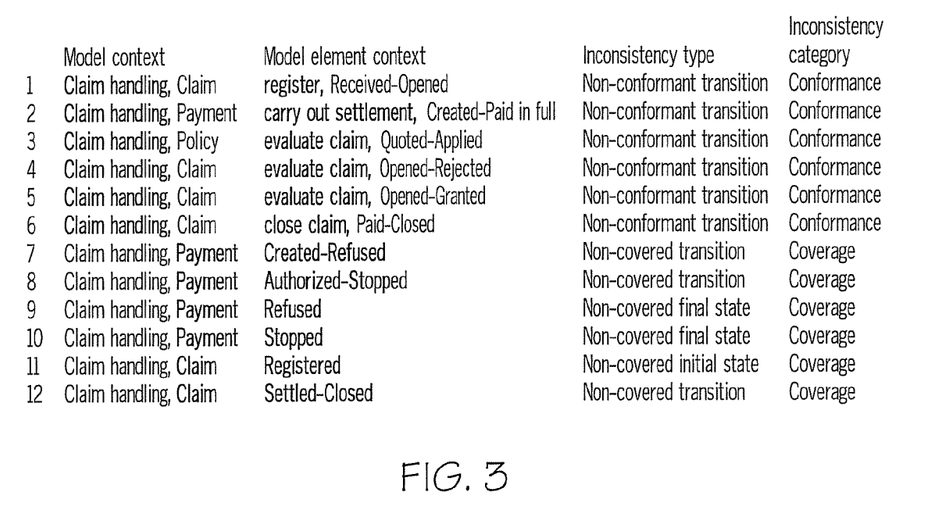
FIG. 3 is an inconsistency list, created from the partitioned inconsistencies of FIG. 2A, via the multi-level grouping and ordering as part of the guided model inconsistency resolution processes in an exemplary embodiment.

For the model partition provided as input to this step, we follow the following multi-level grouping and ordering process:

(1) group inconsistencies by abstract model context to produce groups A1, ..., Am;
(2) order groups A1, ..., Am by average model priority
(3) group inconsistencies inside each group Ai by abstract model element context to produce groups $B1_{Ai}, \ldots, Bn_{Am}$
(4) order groups $B1_{A1}, \ldots, Bn_{Am}$ by $\leq_{amec}$ partial order or a total order derived from $\leq$amec
(5) group inconsistencies inside each group $Bj_{Ai}$ by inconsistency type to produce groups $C1_{B1A1}, \ldots, Co_{BnAm}$
(6) order groups $C1_{B1A1}, \ldots, Co_{BnAm}$ by inconsistency type priority Thus, given the inconsistencies in the model partition (nos. 1-12) in FIG. 2B as input, the inconsistency list shown in FIG. 3 after applying this grouping and ordering process results. Abstract model contexts and abstract model element contexts are shown in bold in the Model context and Model element context columns, respectively. This list shows that the user has assigned the highest priority to resolving inconsistencies in the Claim handling business process model and that the priority of Payment life cycle is higher than for the Claim life cycle (ordering done in step 104 of the process). Resolving inconsistencies in this order would require the user to make 3 model changes and 10 model element changes without any backward moves (in contrast to the original 8 model changes and 11 model element changes with 1 backward move).

Up until now, inconsistencies have been considered as a static list that can be traversed by the user. However, this is not always the case when resolutions have side effects, as after each resolution is applied, several inconsistencies may be added to or removed from the inconsistency list. This means that the pre-computed number of context switches is only an approximation of the actual context switches that the user would have to perform during the resolution process. After each resolution is applied, the grouping and ordering process has to be reapplied to the inconsistencies for the current model partition.

Figure 4:
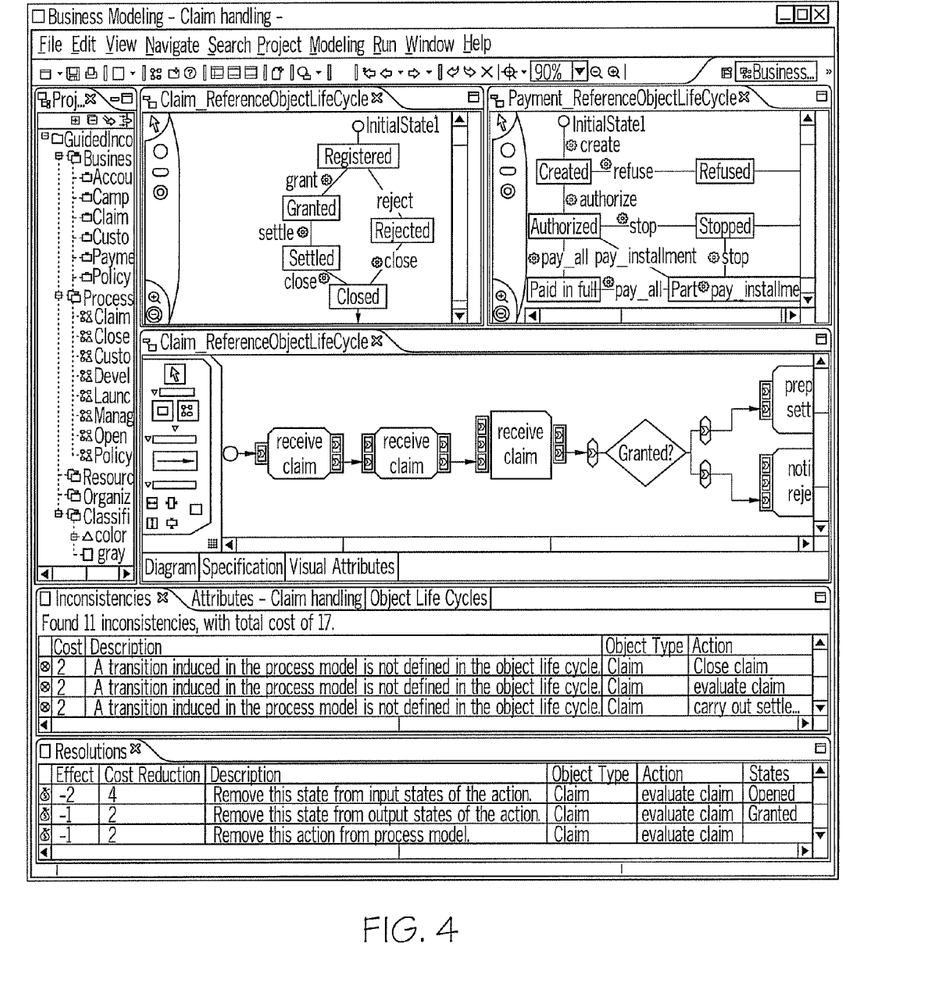
FIG. 4 is a user interface screen depicting inconsistencies and corresponding resolutions provided by the guided model inconsistency resolution processes in an exemplary embodiment.

At the end of step 106, abstract model element context of the first inconsistency in the ordered list is provided to step 108 of the Resolution phase. Given an inconsistency context, or more precisely an abstract model element context, its associated inconsistencies are shown to the user (see FIG. 4). The inconsistency selected in the shown list is visualized in the editors and its associated resolutions are shown (e.g., via a user interface screen of FIG. 4). For a conformance inconsistency, the related task in the business process model editor and the related object life cycle are highlighted. For a coverage inconsistency, a transition or a state in the object life cycle editor and the related business process model are indicated.

Resolutions with side-effects that create new relationships between existing models and, as a result, merge existing model partitions can lead to resolution conflicts if different people are assigned to these model partitions. Such resolutions are highlighted for the user to want him that resolution application may need the agreement of others. For example, consider adding a new task that uses a Policy object to the Close account business process model, which can be defined as a resolution for some inconsistency. If this resolution is applied, a new relationship is introduced between the Close account business process model and the Policy object life cycle, which results in a merger of two model partitions (see two top partitions in FIG. 2A).

Returning now to FIG. 1, at step 110, the user applies one of the alternative resolutions to the given inconsistency. After this, the inconsistency list will be adjusted according to the effects of the applied resolution. If new resolutions were introduced, these are inserted into an appropriate place by the grouping and ordering process (see step 106). If there are more inconsistencies in the current model partition (steps 112 and 114), these are addressed by repeating steps 108 and 110. Otherwise, the next model partition is addressed (step 116), and the process returns to step 106.

Figure 5:
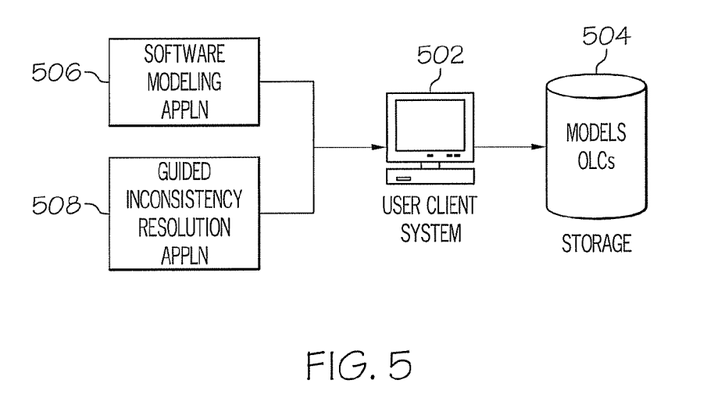
FIG. 5 is a block diagram of a system upon which guided model inconsistency resolution processes may be implemented in an exemplary embodiment.

The guided model inconsistency resolution processes may be implemented via a system as shown in FIG. 5. The system of FIG. 5 includes a user client system 502 executing a business process modeling application 506, e.g., IBM® WebSphere Business Modeler. The user client system 502 may be any type of computer processing device (e.g., general-purpose desktop) known in the art. In an exemplary embodiment, the user client system 502 also executes a guided inconsistency resolution application 508 for implementing the exemplary processes described herein. The application 508 may include a user interface for facilitating the guided inconsistency resolution processes described herein (e.g., via the user interface screen of FIG. 4). It will be understood that the application 508 may be a plug-in component to an existing business processing modeling application (e.g., application 506) or may be a stand-alone product that includes the business process modeling features of application 506. The user client system 502 includes memory 504 for storing business process models, object life cycles and other data typically found in a business process modeling software development environment.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments have been described, it will be understood that those skilled in the art, both now and in the future, may make various improvements and enhancements which fall within the scope of the claims which follow. These claims should be construed to maintain the proper protection for the invention first described.

What is claimed is:

1. A method for guided resolution of inter-model inconsistencies, comprising:
    grouping inconsistencies, detected as a result of a model-driven software development process, into model partitions within a list by analyzing relationships between the underlying models and identifying model partitions that are capable of being processed independently from one another during a resolution process;
    assigning priorities to models that contribute to the detected inconsistencies and inconsistency types, the priorities determining an order in which corresponding inconsistencies are presented to a user during the resolution process;
    reordering the list of inconsistencies to minimize the number of context switches during the resolution process, comprising:
        grouping the inconsistencies for a selected model partition by a corresponding abstract model context to produce groups $A1, \ldots, Am$;
        ordering the groups $A1, \ldots, Am$ by average model priority;
        grouping the inconsistencies within each of the ordered groups $Ai$ by abstract model element context, resulting in groups $B1_{A1}, \ldots, Bn_{Am}$;
        ordering the groups $B1_{A1}, \ldots, Bn_{Am}$ by one of a partial order ($\leq$amec) defined for corresponding abstract model element contexts and a total order derived from the $\leq$amec;
        grouping inconsistencies inside each of the groups $Bj_{Ai}$ by inconsistency type to produce groups $C1_{B1A1}, \ldots, Co_{BnAm}$; and
        ordering the groups $C1_{B1A1}, \ldots, Co_{BnAm}$ by inconsistency type priority; and
    presenting, via a user interface screen, a listing of the inconsistencies and associated resolutions resulting from the reordering to the user at a client system;
    wherein the user applies a selected resolution for each of the inconsistencies presented via the user interface screen.

2. The method of claim 1, wherein, for a given inconsistency i, the abstract model element context of the inconsistency i is a subset of its model element context comprising only the main elements for visualizing the inconsistency i.

3. The method of claim 1, wherein the abstract model context of the inconsistency i (amc(i)), is a subset of its model context that comprises only those models that contain elements of its abstract model element context.

4. The method of claim 1, wherein types of context switches include model element change and model change;
    wherein moving between inconsistencies i1 and i2 requires the model element change if the abstract model element contexts of i1 and i2 do not overlap, and the model change if the abstract model contexts of i1 and i2 do not overlap.

5. The method of claim 1, wherein the priorities include:
    model priority, specifying relative importance of resolving inconsistencies in different business process models; and
    inconsistency type priority, specifying relative importance of resolving different inconsistencies of different types.

6. A system for guided resolution for inter-model inconsistencies, comprising:
    a computer system executing a business process or software modeling application; and
    a guided model inconsistency resolution application executing on the computer system, the guided model inconsistency resolution implementing a method, comprising:
    grouping inconsistencies, detected as a result of a model-driven software development process, into model partitions within a list by analyzing relationships between the underlying models and identifying model partitions that are capable of being processed independently from one another during a resolution process;
    assigning priorities to models that contribute to the detected inconsistencies and inconsistency types, the priorities determining an order in which resolution of corresponding inconsistencies are presented to a user at the computer system;
    reordering the list of inconsistencies to minimize the number of context switches during the resolution process, comprising:
        grouping the inconsistencies for a selected model partition by a corresponding abstract model context to produce groups $A1, \ldots, Am$;
        ordering the groups $A1, \ldots, Am$ by average model priority;
        grouping the inconsistencies within each of the ordered groups $Ai$ by abstract model element context, resulting in groups $B1_{A1}, \ldots, Bn_{Am}$;
        ordering the groups $B1_{A1}, \ldots, Bn_{Am}$ by one of a partial order ($\leq$amec) defined for corresponding abstract model element contexts and a total order derived from the $\leq$amec;
        grouping inconsistencies inside each of the groups $Bj_{Ai}$ by inconsistency type to produce groups $C1_{B1A1}, \ldots, Co_{BnAm}$; and
        ordering the groups $C1_{B1A1}, \ldots, Co_{BnAm}$ by inconsistency type priority; and
    presenting, via a user interface screen of the guided model inconsistency resolution application, a listing of the inconsistencies and associated resolutions resulting from the reordering to the user;
        wherein the user applies a selected resolution for each of the inconsistencies presented via the user interface screen.

* * * * *